(12) United States Patent
Priester

(10) Patent No.: US 6,350,088 B1
(45) Date of Patent: Feb. 26, 2002

(54) WINCH

(76) Inventor: James D. Priester, P.O. Box 286, Mansfield, TX (US) 76063

( * ) Notice: Subject to any disclaimer, the term of this patent is extended or adjusted under 35 U.S.C. 154(b) by 0 days.

(21) Appl. No.: 09/450,563

(22) Filed: Nov. 30, 1999

(51) Int. Cl.$^7$ ............................................... B61D 45/00
(52) U.S. Cl. ........................ 410/103; 410/100; 410/104
(58) Field of Search .................. 410/8, 10, 11, 410/12, 100, 101, 103, 104; 24/68 CD, 265 CD; 248/499; 254/213, 223, 222, 329

(56) References Cited

U.S. PATENT DOCUMENTS

| 3,697,045 A | * | 10/1972 | Farley | 410/103 |
|---|---|---|---|---|
| 4,367,993 A | * | 1/1983 | Meigs | 410/103 |
| 4,382,736 A | | 5/1983 | Thomas | 410/104 |
| 4,992,015 A | | 2/1991 | Florence | 410/104 |
| 5,433,565 A | * | 7/1995 | Chan | 410/103 |
| 5,490,749 A | * | 2/1996 | Arbuer | 410/103 |
| 5,664,918 A | * | 9/1997 | Heider et al. | 410/103 |
| 5,791,844 A | | 8/1998 | Anderson | 410/103 |
| 5,853,164 A | * | 12/1998 | Hunt | 410/103 X |
| 5,860,777 A | | 1/1999 | Walsh et al. | 410/100 |

* cited by examiner

Primary Examiner—Stephen T. Gordon
(74) Attorney, Agent, or Firm—Stephen R. Greiner

(57) ABSTRACT

A winch having a U-shaped frame with a base and a pair of legs extending downwardly from the base. The frame is provided with a transverse, mounting slot extending across the base and into the legs where such terminates at opposed, dog-legged ends. A roller is rotatably secured to the legs. One end of the roller is provided with a number of sockets for engagement with a lever and is reinforced by a collar. A ratchet wheel is affixed to the other end of the roller. A pawl suspended from one of the legs selectively permits the ratchet wheel and attached roller to rotate in one direction.

4 Claims, 1 Drawing Sheet

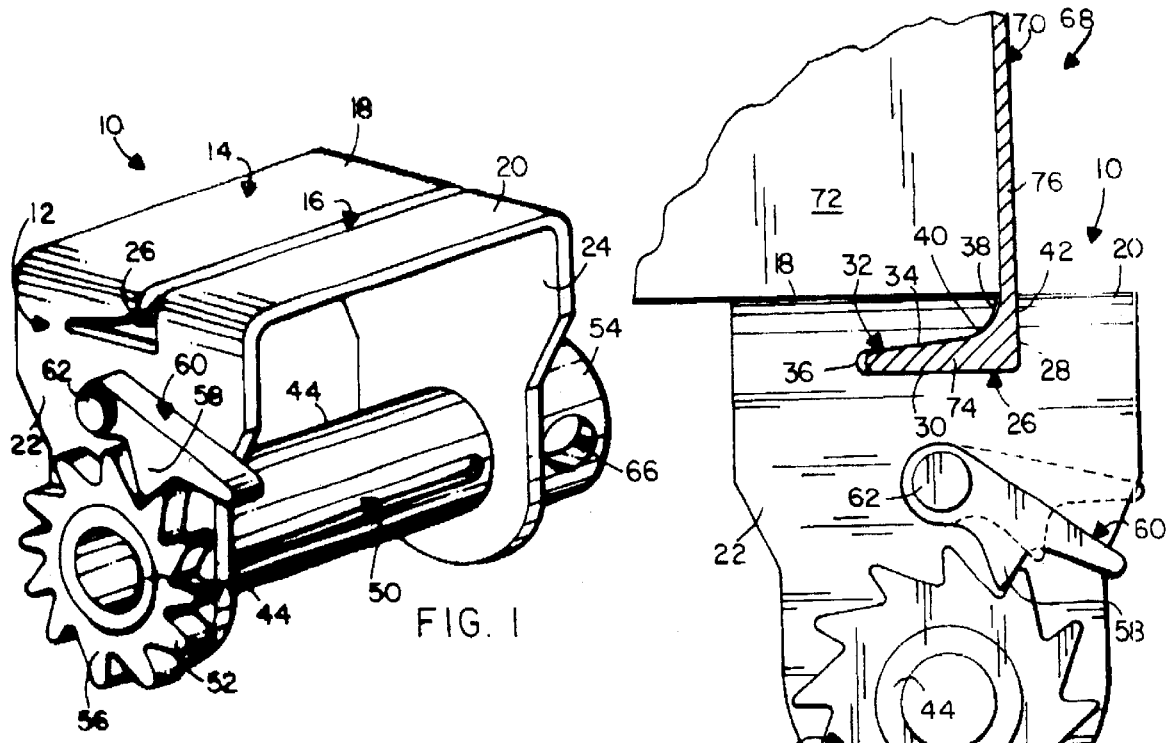
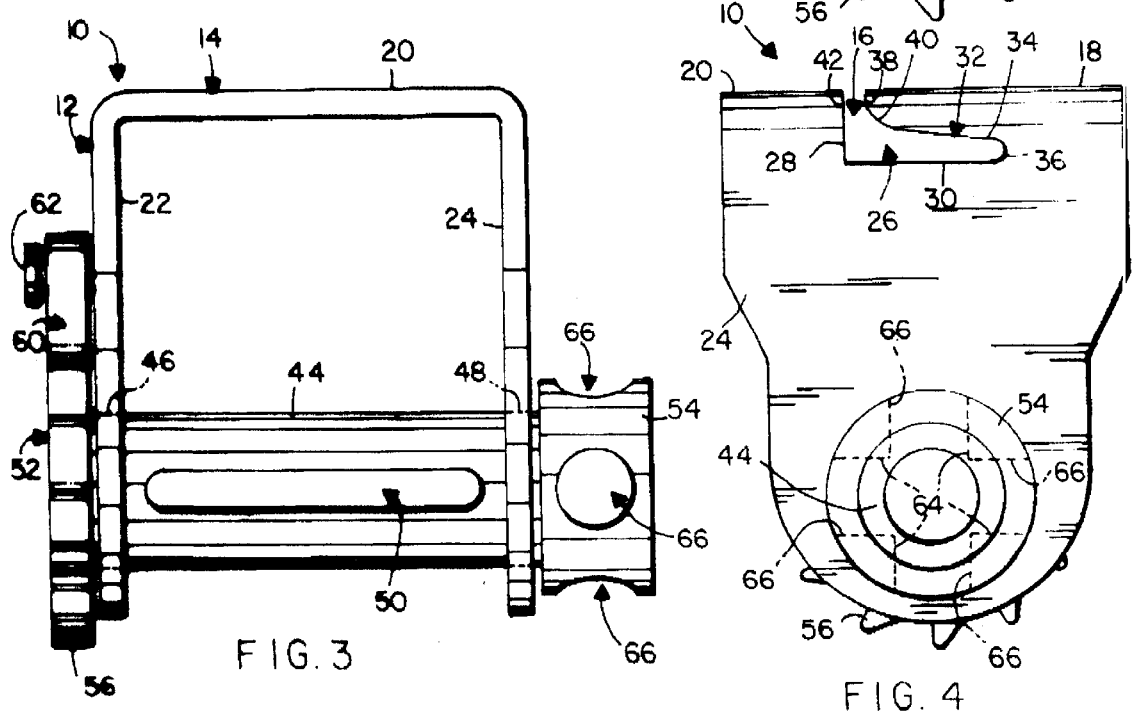

WINCH

FIELD OF THE INVENTION

The present invention relates generally to freight accommodation on freight carriers and, in particular, to load lashing retainers including tensioners.

BACKGROUND OF THE INVENTION

Winches serving as take-up devices for flexible straps have long been used for tying cargo atop flatbed trailers. Typically, such winches were immovably joined to trailers for maximum strength. To permit odd-sized loads to be more easily tied to trailers, however, track-type systems have been recently developed which permit winches to slide the length of a trailer.

Track-type systems typically employ a channel member mounted upon one side of a trailer and a number of winches each with a portion shaped for a sliding fit within the channel member. With the interior of the channel member being unobstructed, the winches may be moved from one end of the channel member to the other. Thus, a user may position the winch on a trailer at any location where a tie-down strap is needed.

A typical channel member serving as a winch track weighs about eight pounds per linear foot and may be over forty feet in length. Simple math dictates that such a track will weigh more than three hundred pounds—extra weight which decreases fuel efficiency and increases wear to the truck hauling the trailer. A need, therefore, exists for a winch which may be slidably mounted upon the sides of a conventional flatbed trailer without adding unnecessary weight to the trailer.

SUMMARY OF THE INVENTION

In light of the problems associated with the known winches for use in securing loads upon flatbed trailers, it is a principal object of the invention to provide a winch which can slide on portions of a conventional flatbed trailer without resort to a heavy track. Such a winch will reduce the work required to be performed by a towing vehicle and improve its fuel efficiency and lengthen its useful life.

It is another object of the invention to provide a winch of the type described which can be operated by a single user without prolonged training and without special tools.

It is an object of the invention to provide improved elements and arrangements thereof in a winch for the purposes described which is relatively lightweight in construction, inexpensive to manufacture, and dependable in use.

Briefly, the winch in accordance with this invention achieves the intended objects by featuring a U-shaped frame with a base and a pair of legs extending downwardly from the base. A transverse, mounting slot extends across the base and into the legs where such terminates at opposed, dog-legged ends. A roller is rotatably secured to the legs. One end of the roller is provided with one or more sockets for engagement with a lever and is reinforced by a collar. A ratchet wheel is affixed to the other end of the roller. A pawl suspended from one of the legs selectively permits the ratchet wheel and the attached roller to rotate in one direction.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of a winch in accordance with the present invention.

FIG. 2 is a left side view of the winch of FIG. 1.

FIG. 3 is a front view of the winch.

FIG. 4 is a right side view of the winch.

Similar reference characters denote corresponding features consistently throughout the accompanying drawings.

DETAILED DESCRIPTION OF THE PREFERRED EMBODIMENT

Referring now to the FIGS., a winch in accordance with the present invention is shown at 10. Winch 10 includes a U-shaped frame 12 having a base 14 split by a transverse, mounting slot 16 into a back plate 18 and a front plate 20. A pair of legs 22 and 24 project downwardly from opposite ends of base 14 and join front and back plates 18 and 20 together in a side by side manner.

Slot 16 extends the length of base 14 and into legs 22 and 24 where it terminates at dog-legged ends 26. Each dog-legged end 26 includes: a vertical, front wall 28; a horizontal, bottom wall 30 extending rearwardly from the bottom of front wall 28; and a back wall 32 snaking from the back of bottom wall 30 toward the top of front wall 28. Each back wall 32 has an elongated, central portion 34 that is substantially parallel to bottom wall 30 and is connected to both bottom wall 30 by a short, bottom portion 36 and to the front edge 38 of back plate 18 by a top portion 40. Similarly, the top of each front wall 28 smoothly joins the rear edge 42 of front plate 20.

The opposite ends of a hollow roller 44 are journaled for rotation in close-fitting and axially-aligned apertures 46 and 48 provided in legs 22 and 24 of frame 12. Elongated openings 50 are provided in opposite sides of the roller 44 between legs 22 and 24 for attachment of a tie down strap (not shown) in the usual manner. Roller 44 is retained within apertures 46 and 48 by means of a ratchet wheel 52 affixed to its left end and an apertured collar 54 joined to its right end.

Ratchet wheel 52 has a plurality of inclined teeth 56 about its periphery for receiving the downwardly-projecting detent 58 of a pawl 60 suspended by a pivot pin 62 above ratchet wheel 52. As shown, teeth 56 are of such shape as to revolve and pass detent 58 in one direction only, clockwise in FIGS. 1 and 2. Thus, the motion of ratchet wheel 52 and attached roller 44 in a counter-clockwise direction is arrested by pawl 60.

The right side of roller 44 is provided with four sockets 64 oriented ninety degrees apart for releasably receiving a lever (not shown). Collar 54 is snugly positioned upon, and welded onto, the right side of roller 44. Bores 66 are provided in collar 54 which are sized and positioned for alignment with the walls of sockets 64. By increasing the thickness of the material at the right end of roller 44, a lever will cause no damage to the roller 44 when imparting a tensile force of ten thousand pounds or more to a tie-down strap during use of winch 10.

Winch 10 is used with a conventional, flatbed trailer, a portion of which is shown at 68. Trailer 68 includes a pair of side rails 70 (one shown) joined by a number of girders 72 (one shown). Each rail 70 is C-shaped with a pair of parallel flanges 74 (bottom one shown) connected by a cross piece 76. Rails 70 are oriented to open toward one another so that the ends of girders 72 may be welded to cross pieces 76 between flanges 74.

The height of girders 72 is less than the distance between flanges 74, so that gaps are provided between the top and bottom of girders 72 and the adjacent flanges 74. The gap between the top of each girder 72 and flanges 74 is often used to accommodate hardwood planks to assemble a floor. The gap between the bottom of each girder 72 and adjacent flange 74 is usually unobstructed and is adequate to permit mounting of winch 10.

Winch 10 is mounted on trailer 68 by sliding frame 12 onto rail 70 so that flange 74 and the bottom of cross piece 76 extend fully through slot 16. Since the configuration of slot 16 is complementary to that of the bottom of rail 70, bottom and back walls 30 and 32 abut flange 74 and front wall 28 abuts the front of cross piece 76 to prevent the rotation of frame 12 on rail 70. Thus, slot 16 makes it possible to adjust the position of winch 10 by merely sliding winch 10 to a desired location on rail 70—a part of a conventional trailer 68.

Once winch 10 is positioned at a chosen spot, a portion of the strap is unwound from roller 44 and is thrown over cargo positioned atop trailer 68. After passing the strap over the cargo, its distal end is secured to trailer 68 in a suitable manner. Now, by rotating roller 44 slack in the strap may be removed to tighten the strap over the cargo.

Loosening a strap is easily accomplished by rotating roller 44 and attached ratchet wheel 52 slightly to disengage detent 58 from a tooth 56. Then, pawl 60 is elevated and ratchet wheel 52 is permitted to rotate counter-clockwise as shown in FIGS. 1 and 2, with detent 58 falling between successive teeth 56 as a safety measure. When loose, the distal end of the strap is detached from trailer 68 and the strap is gathered upon roller 44 for subsequent reuse. The entire process of securing winch 10 to trailer 68, deploying and tightening a strap, and then gathering the strap requires a few minutes to accomplish even under adverse weather conditions.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A winch, comprising:
   a U-shaped frame having a base and a pair of legs extending downwardly from said base, said U-shaped frame being provided with a transverse, mounting slot extending across said base and into each of said legs, said mounting slot having opposed, dog-legged ends with substantially vertical and horizontal segments positioned within each of said legs;
   a roller rotatably secured to said legs, said roller having first and second, opposed ends, said first opposed end being provided with a socket for engagement with a lever;
   a ratchet wheel affixed to said second opposed end of said roller, said ratchet wheel having a plurality of inclined, peripheral teeth; and,
   a pawl suspended from said frame and having a detent for engagement with said peripheral teeth so as to selectively permit said ratchet wheel to rotate in one direction.

2. The winch according to claim 1 further comprising a collar secured over said first opposed end of said roller, said collar being provided with a bore axially aligned with said socket in said roller.

3. A winch, comprising:
   a U-shaped frame having a base and a pair of legs extending downwardly from said base, said U-shaped frame being provided with a transverse, mounting slot extending across said base and into each of said legs, said mounting slot having opposed, dog-legged ends with substantially vertical and horizontal segments positioned within each of said legs, and said legs being provided with a pair of axially-aligned apertures beneath said dog-legged ends of said mounting slot;
   a roller rotatably secured within said axially-aligned apertures in said legs, said roller having first and second, opposed ends, said first opposed end being provided with a plurality of sockets for selective engagement with a lever;
   a collar secured over said first opposed end of said roller, said collar being provided with a plurality of bores axially aligned with said sockets in said roller;
   a ratchet wheel affixed to said second opposed end of said roller, said ratchet wheel having a plurality of inclined, peripheral teeth; and,
   a pawl suspended from one of said legs, said pawl having a detent for engagement with said peripheral teeth to selectively permit said ratchet wheel to rotate in one direction.

4. A winch, comprising:
   a U-shaped frame including:
      a base having a front plate and a back plate;
      a pair of legs extending downwardly from said base and joining said front plate and said back plate, said legs being provided with a pair of axially-aligned apertures, and,
      said U-shaped frame being provided with a transverse, mounting slot s pacing said front plate from said back plate and extending into said legs where such terminates in opposed, dog-legged ends, each of said dog-legged ends being defined by:
         a vertical, front wall extending downwardly from said front plate into a respective one of said legs;
         a horizontal, bottom wall extending rearwardly from the bottom of said front wall and terminating at a point beneath said back plate;
         a back wall extending upwardly from the back of said bottom wall toward the top of said front wall, said back wall having:
            an elongated, central portion oriented substantially parallel to said bottom wall;
            a concave bottom portion connecting said central portion to said bottom wall; and,
            a convex top portion connecting said central portion to said back plate;
   a roller rotatably secured within said axially-aligned apertures in said legs, said roller having first and second, opposed ends, said first opposed end being provided with a plurality of sockets for selective engagement with a lever;
   a collar secured over said first opposed end of said roller, said collar being provided with a plurality of bores axially aligned with said sockets in said roller;
   a ratchet wheel affixed to said second opposed end of said roller, said ratchet wheel having a plurality of inclined, peripheral teeth; and,
   a pawl suspended from one of said legs, said pawl having a detent for engagement with said peripheral teeth to selectively permit said ratchet wheel to rotate in one direction.

* * * * *